(12) United States Patent
Lee

(10) Patent No.: US 7,556,196 B2
(45) Date of Patent: Jul. 7, 2009

(54) OPTICAL READING HEAD OF SCANNING APPARATUS

(76) Inventor: Teng Kuang Lee, No. 669, Ruey-Kuang Road, Neihu, Taipei (TW) 114

( * ) Notice: Subject to any disclaimer, the term of this patent is extended or adjusted under 35 U.S.C. 154(b) by 408 days.

(21) Appl. No.: 11/206,873

(22) Filed: Aug. 19, 2005

(65) Prior Publication Data
US 2007/0019528 A1  Jan. 25, 2007

(30) Foreign Application Priority Data
Jul. 22, 2005  (TW) .............................. 94124822 A

(51) Int. Cl.
G06K 7/10 (2006.01)
G02B 7/182 (2006.01)
(52) U.S. Cl. .............. 235/454; 235/462.01; 235/462.36; 359/838; 359/872
(58) Field of Classification Search ......... 235/435–486; 359/159–325; 369/112.1–119
See application file for complete search history.

(56) References Cited

U.S. PATENT DOCUMENTS

| | | | | |
|---|---|---|---|---|
| 3,259,009 A | * | 7/1966 | Walter | 355/50 |
| 4,494,830 A | * | 1/1985 | Grainge et al. | 359/876 |
| 4,497,573 A | * | 2/1985 | Tokuhara et al. | 355/58 |
| 5,979,761 A | * | 11/1999 | Wurz et al. | 235/454 |
| 6,494,583 B2 | * | 12/2002 | Lu | 353/98 |
| 2004/0182985 A1 | | 9/2004 | Hong | |
| 2006/0114365 A1 | | 6/2006 | Takahashi | |
| 2006/0278707 A1 | * | 12/2006 | Wang et al. | 235/454 |

FOREIGN PATENT DOCUMENTS

| | | |
|---|---|---|
| JP | 62217219 | 9/1987 |
| JP | 1-142912 | 9/1989 |
| JP | 05030293 | 2/1993 |
| TW | 570448 | 1/2004 |

* cited by examiner

*Primary Examiner*—Daniel Walsh
*Assistant Examiner*—Christle I Marshall
(74) *Attorney, Agent, or Firm*—Workman Nydegger

(57) ABSTRACT

An optical reading device of a scanning apparatus includes a housing, two movable mirror clamps and two supporting plates. The housing contains therein a light source, a mirror set, a lens and an image sensor. These two movable mirror clamps are used for clamping both edges of a specific reflective mirror of said mirror set such that the position of said specific reflective mirror is adjustable by an assembler. These two supporting plates are protruded from opposite sides of said housing for supporting said movable mirror clamps.

29 Claims, 6 Drawing Sheets

OPTICAL READING HEAD OF SCANNING APPARATUS

FIELD OF THE INVENTION

The present invention relates to an optical reading head of a scanning apparatus, and more particularly to an optical reading head having movable mirror clamps for adjusting the optical path thereof.

BACKGROUND OF THE INVENTION

Referring to FIG. 1, a schematic cross-sectional view of a conventional scanning apparatus 1 is illustrated. The scanning apparatus 1 comprises an optical reading head 10 therein. In the housing 100 of the optical reading head 10, a light source 101, a mirror set including plural reflective mirrors 102A~102E, a lens 103 and an image sensor 104 are provided. During operation, the light emitted from the light source 101 is projected onto an object 11 to be scanned. The light reflected from the scanned object 11 is successively reflected by the plural reflective mirrors 102A, 102B, 102C, 102D and 102E, and then focused by the lens 103. The focused light is then imaged onto the image sensor 104 to convert the optical signals into analog electrical signals. In addition, the optical reading head 10 of the scanning apparatus 1 is driven by a driving device (not shown) so as to scan the whole object 11.

Please refer to FIG. 1 again. After the light source 101, the mirror set, the lens 103 and the image sensor 104 are mounted within the optical reading head 10, a magnification correcting procedure should be performed. By precisely adjusting the distance from the object 11 to the lens 103 (defined as an objective distance) or the distance between the lens 103 and the image sensor 104 (defined as an image distance), tolerance of magnification for the optical reading head 10 would be equal to or less than a preset value. The preset value is usually less than 0.5. As shown in FIG. 1, the reflective mirrors 102A~102E of the mirror set are fixedly arranged within the optical reading head 10 and located in the optical path between the object 11 and the lens 103. Under this circumstance, the assembler may correct the magnifying power of the optical reading head 10 only by adjusting the position of the lens 103 relative to the image sensor 104 in the optical path. Since the distance between the lens 103 and the image sensor 104 is much smaller than that between the object 11 and the lens 103, it is difficult to precisely image the object 11 onto the image sensor 104 during the process of assembling the optical reading head 10 and reduce the tolerance of magnification. Therefore, it is desired to add a mirror adjustment mechanism to the optical reading head 10 so as to facilitate correcting the magnifying power of the optical reading head 10 in a simple and precise manner.

On the other hand, the mirror set or the image sensor 104, which should be precisely positioned, is readily sloped during the assembling process. In addition to the undesired sloping movement of the mirror set or the image sensor 104, the inherent imaging tolerance of the lens 103 also contributes to the sloping movement of the optical path for the optical reading head 10. As known, the assembler fails to overcome these problems by adjusting the position of the lens 103 or the image sensor 104.

In views of the above-described disadvantages of the prior art, the applicant keeps on carving unflaggingly to develop an optical reading head of a scanning apparatus according to the present invention through wholehearted experience and research.

SUMMARY OF THE INVENTION

As previously described, it is difficult to effectively minimize the tolerance of magnification and correct the sloping movement of the optical path for the conventional optical reading head.

It is an object of the present invention to provide an optical reading head of a scanning apparatus by adding a mirror adjustment mechanism to the optical reading head so as to properly adjust the distance between the scanned object and the lens and minimize the sloped optical path in the optical reading head.

In accordance with an aspect of the present invention, there is provided an optical reading device of a scanning apparatus. The optical reading device comprises a housing, two movable mirror clamps and two supporting plates. The housing contains therein a light source, a mirror set, a lens and an image sensor. These two movable mirror clamps are used for clamping both edges of a specific reflective mirror of said mirror set such that the position of said specific reflective mirror is adjustable by an assembler. These two supporting plates are protruded from opposite sides of said housing for supporting said movable mirror clamps.

In an embodiment, each of the two movable mirror clamps has a gap and a tenon to accommodate one edge of the specific reflective mirror.

In an embodiment, each of the two supporting plates further comprises a groove, and each of the two movable mirror clamps further comprises a linear block corresponding to the groove.

In an embodiment, each of the two supporting plates further comprises a guiding slot, and each of the two movable mirror clamps further comprises a bolt hole pedestal corresponding to the guiding slot.

In an embodiment, each of the two movable mirror clamps is combined with respective one of the two supporting plates when a screw penetrates through the guiding slot and is screwed into the bolt hole pedestal.

In an embodiment, the bottom of each supporting plate further comprises a hole, and the bottom of each movable mirror clamp further comprises a channel corresponding to the hole.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
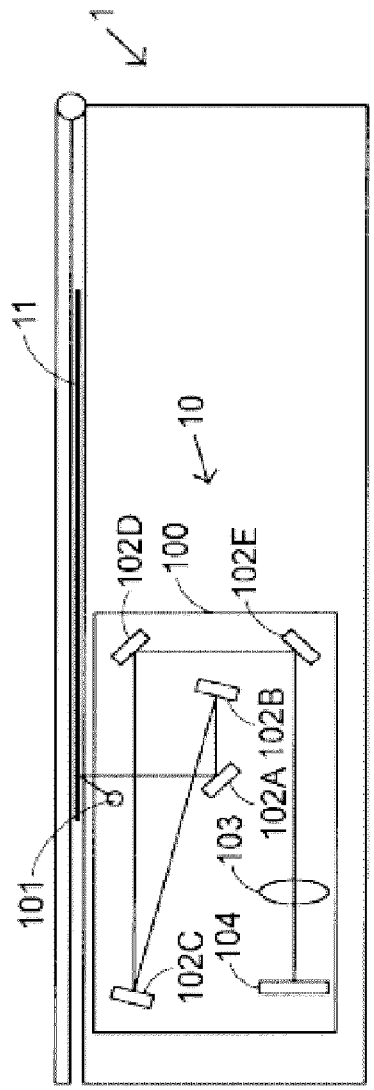
FIG. 1 is a schematic cross-sectional view illustrating an optical reading head of a conventional scanning apparatus.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention. In addition, the elements or structures in the drawings are not limited to the precise form disclosed. Unless specifically stated, the individual element may be extensive to include multiple elements or structures.

Figure 2:
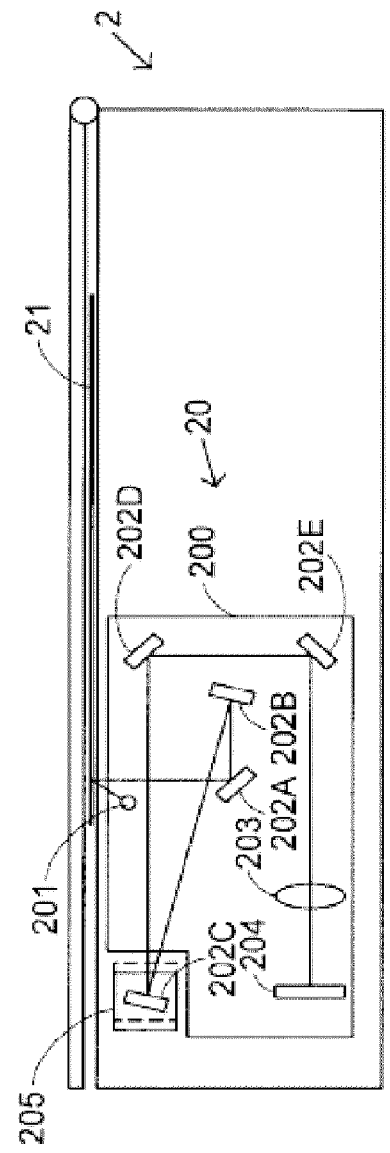
FIG. 2 is a schematic cross-sectional view illustrating an optical reading head of a scanning apparatus according to a preferred embodiment of the present invention.

Referring to FIG. 2, a schematic cross-sectional view of an optical reading device of a scanning apparatus according to a first preferred embodiment of the present invention is shown. In the housing 200 of the optical reading head 20 of the scanning apparatus 2, a light source 201, a mirror set including plural reflective mirrors 202A.about.202E, a lens 203 and an image sensor 204 are provided. During operation, the light emitted from the light source 201 is projected onto an object 21 to be scanned. The light reflected from the scanned object 21 is successively reflected by the plural reflective mirrors 202A, 202B, 2020, 202D and 202E, and then focused by the lens 203. The focused light is then imaged onto the image sensor 204 to convert the optical signals into analog electrical signals. In addition, the optical reading head 20 of the scanning apparatus 2 is driven by a driving device (not shown) so as to scan the whole object 21.

Please refer to FIG. 2 again. The optical reading head 20 further comprises two movable mirror clamps 205 and 206 (the movable mirror clamp 206 is shown in FIG. 3B) for clamping both edges of one of the reflective mirrors 202A~202E. In this embodiment, these movable mirror clamps 205 and 206 clamp both edges of the reflective mirror 202C, respectively. By means of the movable mirror clamps 205 and 206, the assembler is capable of adjusting the position of the reflective mirror 202C such that the tolerance of magnification of the optical reading head 20 is less than a preset value. In addition, if any of the other optical elements is sloped during the assembling process, the undesired sloping movement may be corrected by adjusting these movable mirror clamps 205 and 206.

For a purpose of adjusting the movable mirror clamps without adjustment of any other reflective mirror, the reflective mirror intended to be clamped by the movable mirror clamps 205 and 206 should be suitably selected according to some preliminary experiments. In the embodiment of FIG. 2, the reflective mirror 202C is arranged in the vicinity of the sidewall of the housing 200. Once the reflective mirror 202C is moved horizontally, the angle or position of the adjacent reflective mirror such as the reflective mirror 202B or 202D may be kept unchanged. Under this circumstance, the reflective mirror 202C conforms to the movable mirror clamp 205 very well. Furthermore, since the reflective mirror 202C is arranged near the sidewall of the housing 200, the assembler is capable of easily adjusting the reflective mirror 202C and the movable mirror clamp 205 so as to further perform a magnification correcting procedure.

Figure 3A:
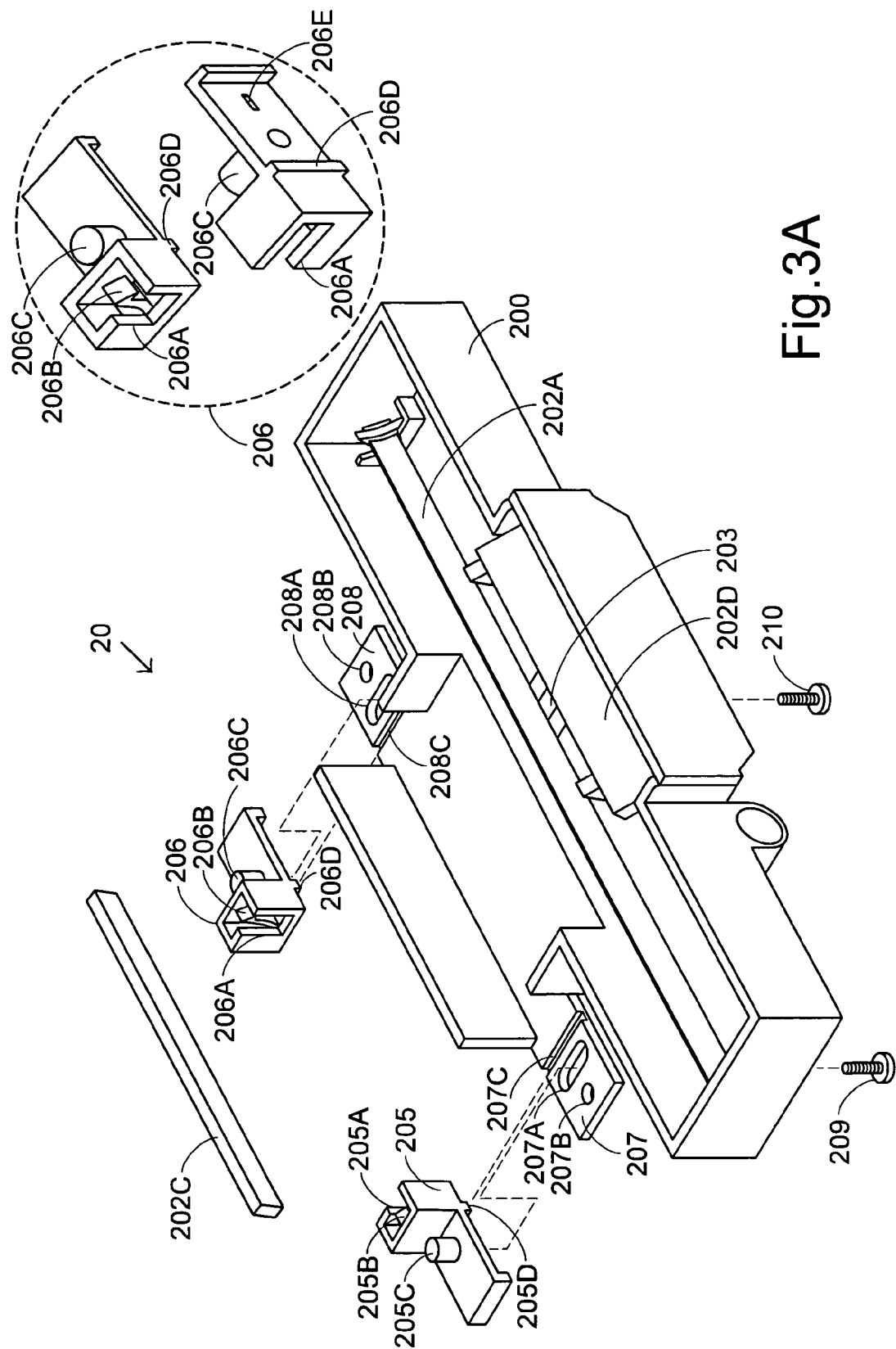
FIGS. 3A and 3B are schematic exploded views illustrating the optical reading head according to the preferred embodiment of the present invention.
Figure 3B:
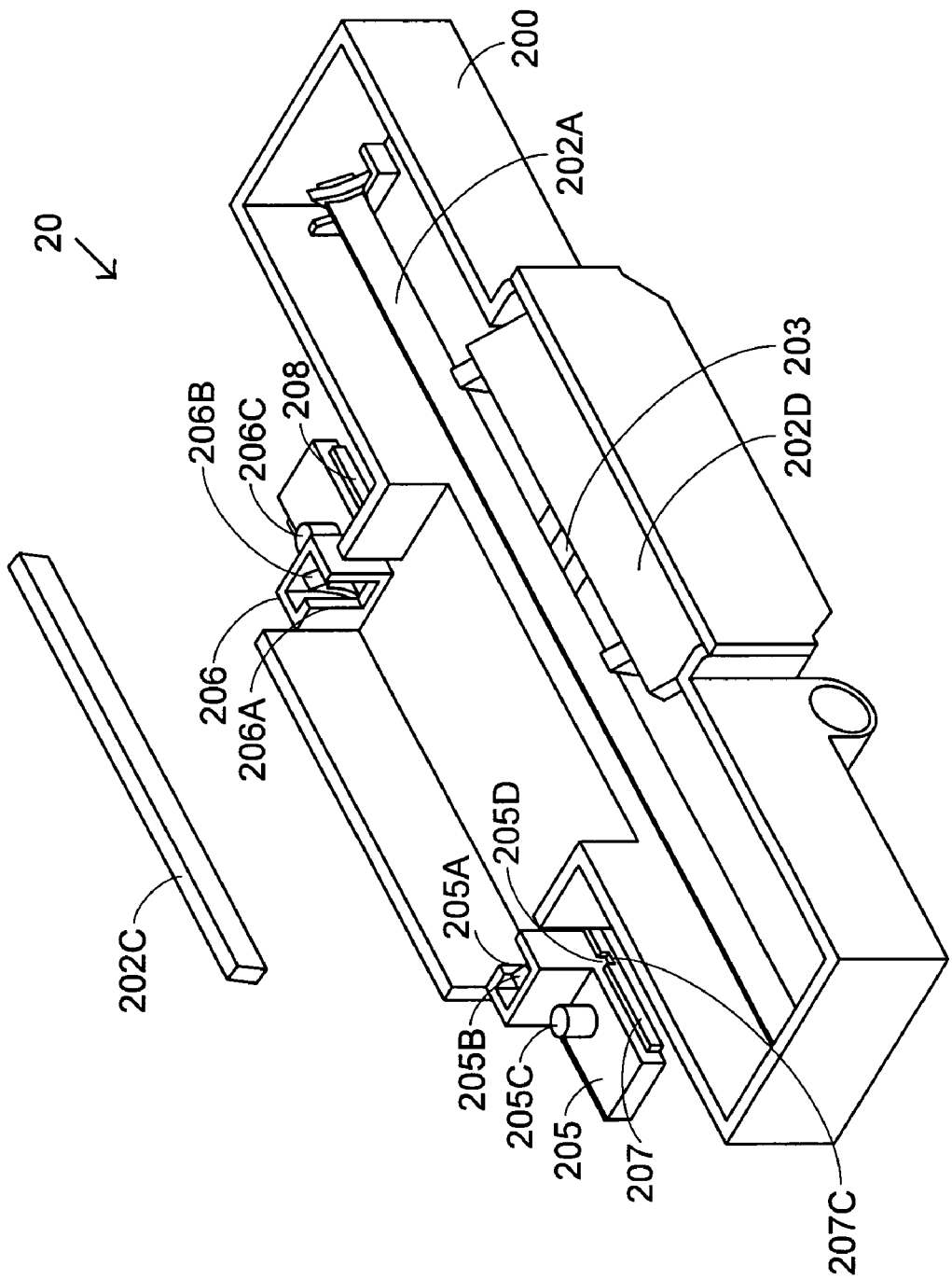
Figure 3C:
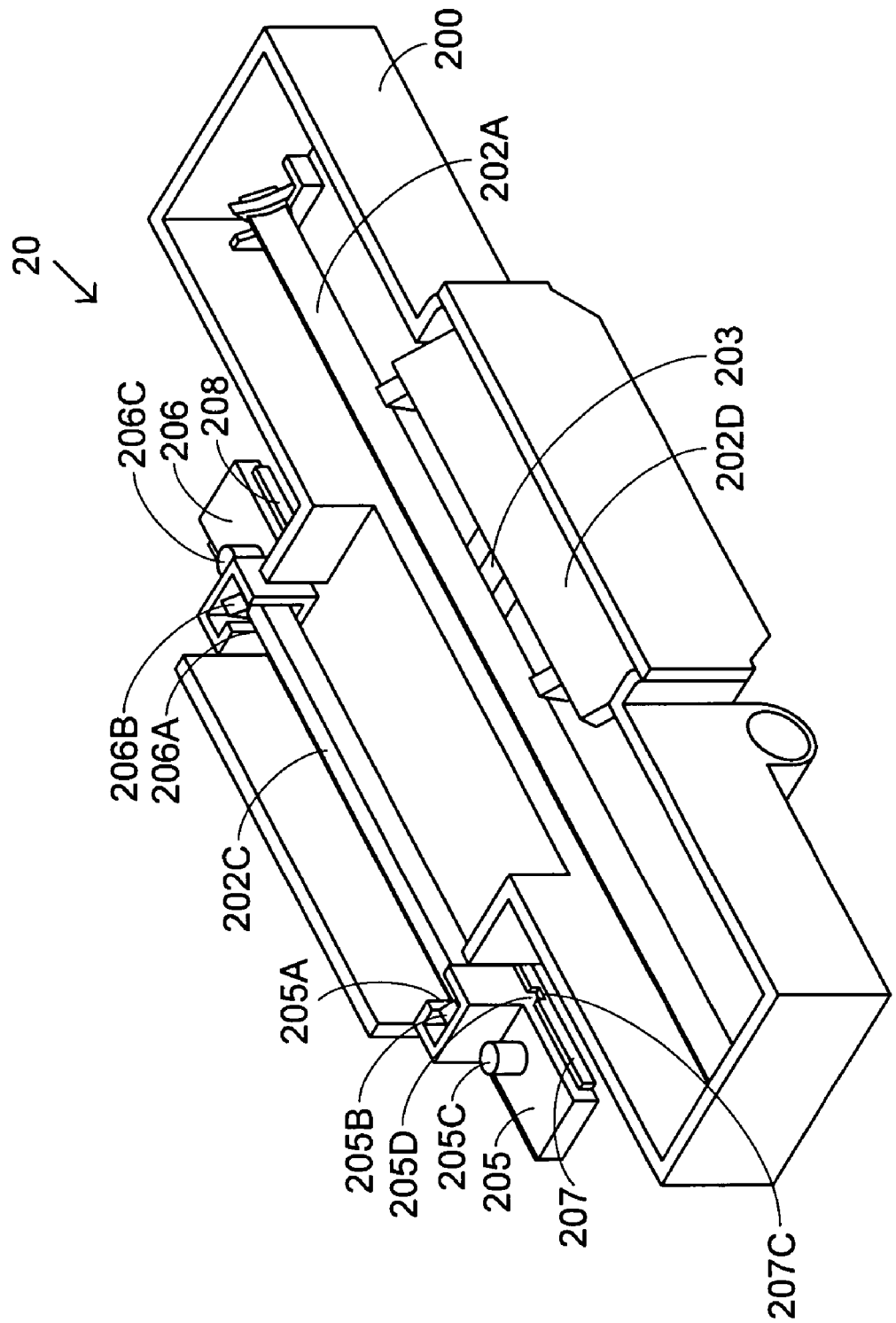
FIG. 3C is a schematic assembled view illustrating the optical reading head of FIG. 3A.

Please refer to FIGS. 3A to 3C, which schematically illustrate the exploded and assembled views of the optical reading device according to a preferred embodiment of the present invention, respectively.

In FIG. 3A, the optical reading head 20 comprises a housing 200, two movable mirror clamps 205 and 206, and two supporting plates 207 and 208. A light source 201, a mirror set (not shown), a mirror set, a lens 203 and an image sensor (not shown) are contained in the housing 200 of the optical reading head 20. The supporting plates 207 and 208 are protruded from opposite sides of the housing 200 in order to support the movable mirror clamps 205 and 206, respectively. The movable mirror clamp 205 has a V-shaped or U-shaped gap 205A and a tenon 205B on a side thereof. Likewise, the movable mirror clamp 206 has an identical gap 206A and an identical tenon 206B, which face to the gap 205A and the tenon 205B, respectively.

Referring to FIG. 3A again, the movable mirror clamp 205 has a bolt hole pedestal 205C on a surface thereof, and the supporting plate 207 has a guiding slot 207A corresponding to the bolt hole pedestal 205C. When a screw 209 penetrates through the guiding slot 207A and is screwed into the bolt hole pedestal 205C, the movable mirror clamp 205 is combined with the supporting plate 207. Likewise, the movable mirror clamp 206 has a bolt hole pedestal 206C on a surface thereof, and the supporting plate 208 has a guiding slot 208A corresponding to the bolt hole pedestal 206C. When another screw 210 penetrates through the guiding slot 208A and is screwed into the bolt hole pedestal 206C, the movable mirror clamp 206 is combined with the supporting plate 208. The assembled structure will be illustrated in FIG. 3B.

As shown in FIGS. 3A and 3B, the movable mirror clamps 205 and 206 further comprise linear blocks 205D and 206D corresponding to the grooves 207C and 208C of the supporting plates 207 and 208, respectively. Once the linear blocks 205D and 206D are moved along the grooves 207C and 208C, the movable mirror clamps 205 and 206 would move forwardly or backwardly with respect to the supporting plates 207 and 208, respectively.

After the movable mirror clamps 205 and 206 are combined with the supporting plates 207 and 208, both edges of the reflective mirror 202C are accommodated within the gaps 205A and 206A and then clamped by the tenons 205B and 206B, respectively. The resulting structure of the optical reading head 20 is shown in FIG. 3C. The principle of performing the magnification correcting procedure will be illustrated as follows in more details.

Firstly, the screws 209 and 210 are somewhat loosened such that the mirror clamps 205 and 206 are movable with respect to the supporting plates 207 and 208, respectively. Since the screws 209 and 210 penetrate through the guiding slots 207A and 208A and are screwed into the bolt hole pedestals 205C and 206C, the range of moving the movable mirror clamp 205 (or 206) relative to the supporting plate 207 (or 208) is dependent on the length of individual guiding slot 207A (or 208A). Then, the movable mirror clamps 205 and 206 are moved forwardly or backwardly with respect to the supporting plates 207 and 208 so as to shorten or increase the distance between the scanned object and the lens 203 (i.e. the objective distance). When tolerance of magnification of the optical reading head 20 is equal to or less than a preset value (for example less than 0.5), the screws 209 and 210 are tightly screwed into the bolt hole pedestals 205C and 206C, thereby fixing the movable mirror clamps 205 and 206 on the supporting plates 207 and 208, respectively.

Figure 3D:
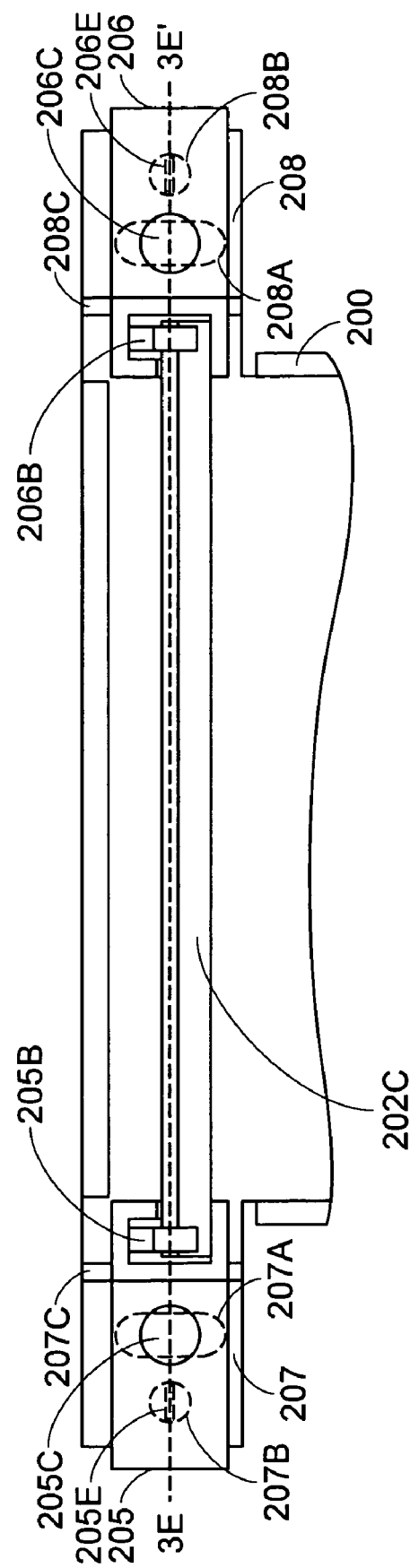
FIG. 3D is a schematic top view illustrating the reflective mirror, the movable mirror clamps, and the supporting plates.

Please refer to FIG. 3D, which is a schematic top view illustrating the reflective mirror 202C, the movable mirror clamps 205 and 206, and the supporting plates 207 and 208. Please also refer to FIG. 3E, which is a schematic cross-sectional view of the optical reading head in FIG. 3D taken along the line 3E-3E'. After the screws 209 and 210 penetrate through the guiding slots 207A and 208A and are loosely screwed into the bolt hole pedestals 205C and 206C, the mirror clamps 205 and 206 are movable relative to the supporting plates 207 and 208 according to the lengths of the guiding slot 207A and 208A, respectively. When the tolerance of magnification of the optical reading head 20 is acceptable, the screws 209 and 210 are tightly screwed into the bolt hole pedestals 205C and 206C so as to fix the movable mirror clamps 205 and 206 on the supporting plates 207 and 208, respectively. On the other hand, in a case that any other optical element of the optical reading head 20, for example the reflective mirror 202A, 202B, 202D or 202E or the image sensor 204, is sloped during the assembling process, or in another case that the inherent imaging tolerance of the lens 203 causes a sloped optical path of the optical reading head 20, the assembler may move one of the mirror clamps 205 and 206 or differentially move both of the mirror clamps 205 and 206. Under this circumstance, the reflective mirror 202C is somewhat rotated in order to precisely correct the optical path. Since the tenons 205B and 206B contained in the movable mirror clamps 205 and 206 are resilient, the movable mirror clamps 205 and 206 may always tightly clamp the reflective mirror 202C even though the mirror clamps 205 and 206 are differentially moved.

Figure 3E:
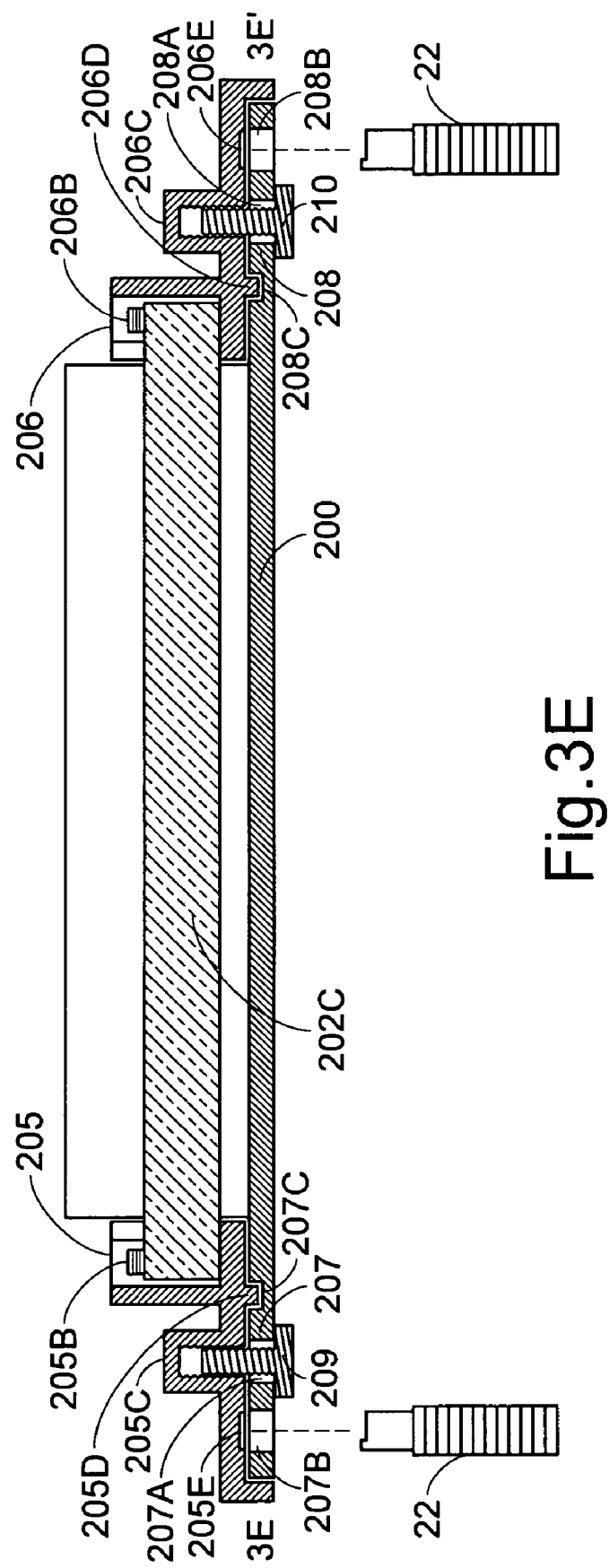
FIG. 3E is a schematic cross-sectional view of the optical reading head in FIG. 3D taken along the line 3E-3E'.

Please refer to FIGS. 3A, 3D and 3E. The bottom of the mirror clamp 205 has a linear channel or aperture 205E corresponding to a circular hole 207B of the supporting plate 207. Likewise, the bottom of the mirror clamp 206 has a linear channel or aperture 206E corresponding to a circular hole 208B of the supporting plate 207. After the screws 209 and 210 are screwed into the bolt hole pedestals 205C and 206C and the movable mirror clamps 205 and 206 are fixed on the supporting plates 207 and 208, respectively, an adjustment rod 22 is selectively inserted into the linear channel 205E (or 206E) via the circular hole 207B (or 208B). By rotating the adjustment rod 22 clockwise or anti-clockwise, a tiny forward or backward movement of the movable mirror clamp 205 or 206 is achievable. Under this circumstance, the position of the movable mirror clamp 205 or 206 relative to the supporting plates 207 or 208 may be precisely controlled.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical reading device of a scanning apparatus, comprising:
   a housing containing therein a light source, a mirror set, a lens and an image sensor, wherein the mirror set provides an optical path to the image sensor;
   two supporting plates protruding from opposite sides of said housing; and
   two movable mirror clamps for clamping both edges of a specific reflective mirror of said mirror set such that the position of said specific reflective mirror is adjustable to differentially move at least one of the two movable mirror clamps to rotate the specific reflective mirror to correct the optical path after the two movable mirror clamps are fixed to the two supporting plates.

2. The optical reading device according to claim 1 wherein each of said two movable mirror clamps has a gap and a tenon to accommodate one edge of said specific reflective mirror.

3. The optical reading device according to claim 1 wherein each of said two supporting plates further comprises a groove, and each of said two movable mirror clamps further comprises a linear block corresponding to said groove.

4. The optical reading device according to claim 1 wherein each of said two supporting plates further comprises a guiding slot, and each of said two movable mirror clamps further comprises a bolt hole pedestal corresponding to said guiding slot.

5. The optical reading device according to claim 4 wherein each of said two movable mirror clamps is combined with respective one of said two supporting plates when a screw penetrates through said guiding slot and is screwed into said bolt hole pedestal.

6. The optical reading device according to claim 1 wherein the bottom of each supporting plate further comprises a hole, and the bottom of each movable mirror clamp further comprises a channel corresponding to said hole.

7. The optical reading device according to claim 1, wherein the two movable mirror clamps are tightly fixed to the two supporting plates when a tolerance of magnification of the optical reading device is less than a pre-set value.

8. The optical reading device according to claim 7, wherein an assembler corrects the optical path by differentially moving at least one of the two movable mirror clamps to adjust for a sloping of the mirror set or of the image sensor.

9. An optical reading device comprising:
   a housing;
   a mirror set that forms an optical path to an image sensor, wherein the plurality of reflective mirrors are arranged to focus light emitted from a light source and reflected by a scanned object on the image sensor;
   two supporting plates connected to the housing, each supporting plate having a guiding slot and a hole;
   a reflective mirror included in the mirror set;
   two movable mirror clamps, each mirror clamp clamping an edge of the reflective mirror, wherein the mirror clamps are tightly fixed with the two supporting plates after the reflective mirror is in a position where a tolerance of magnification is less than a preset value; and
   means for differentially adjusting the position of at least one of the two movable mirror clamps to correct for sloping in the mirror set or image sensor.

10. The optical reading device of claim 9, wherein each movable mirror clamp comprises a gap and a tenon, wherein each gap accommodates an edge of the reflective mirror and each tenon clamps the edge of the reflective mirror in each movable mirror clamp.

11. The optical reading device of claim 9, wherein each of the two supporting plates further comprises a groove and each of the two movable mirror clamps comprises a linear block, wherein the linear block cooperates with the groove to guide the two movable mirror clamps forwards and backwards with respect to the two supporting plates.

12. The optical reading device of claim 9, wherein the two movable mirror clamps are tightly fixed to the two supporting plates by a screw that penetrates through the guiding slot and into a bolt hole pedestal of the two movable mirror clamps.

13. The optical reading device of claim 9, wherein the means for differentially adjusting the position of at least one of the two movable mirror clamps further comprises an assembler that differentially adjusts through the holes of the two supporting plates.

14. The optical reading device of claim 9, wherein the means for differentially adjusting the position of at least one of the two movable mirror clamps rotates the reflective mirror.

15. The optical reading device of claim 9, wherein the two movable mirror clamps comprise a linear channel corresponding to the holes in the two supporting plates, wherein the means for differentially adjusting the position of at least one of the two movable mirror clamps is inserted in the linear channel and rotated to differentially adjust the position of at least one of the two movable mirror clamps.

16. The optical reading device of claim 15, wherein the means for differentially adjusting the position of the at least one of the two movable mirror clamps comprises an adjustment rod that can rotate in the linear channel to precisely adjust the position of at least one of the two movable mirror clamps such that a position of the reflective mirror is precisely controlled to correct the optical path.

17. An optical reading device comprising:
a mirror set that forms an optical path to an image sensor, the mirror set including a reflective mirror;
two movable mirror clamps that clamp on edges of the reflective mirror, each movable mirror clamp having a bolt hole pedestal and a linear channel; and
two supporting plates connected to a housing, each supporting plate having a guiding slot and a hole, wherein the guiding slots and the bolt hole pedestals enable the two supporting plates to be tightly fixed to the two movable mirror clamps at a particular position and the holes and the linear channels allow the particular position of at least one of the two movable mirror clamps to be differentially adjusted after the two supporting plates are tightly fixed to the two movable mirror clamps.

18. The optical reading device of claim 17, wherein the mirror set comprises a plurality of mirrors including the reflecting mirror that form an optical path from light reflected by a scanned object to the image sensor.

19. The optical reading device of claim 17, wherein the position is selected when a tolerance of magnification is less than a preset value.

20. The optical reading device of claim 19, wherein the position is differentially adjusted to improve the tolerance of magnification.

21. The optical reading device of claim 19, wherein the position is differentially adjusted to correct for sloping of the mirror set or the image sensor.

22. The optical reading device of claim 17, further comprises an assembler that inserts into the linear channel through the hole to differentially adjust the position of at least one of the two movable mirror clamps.

23. The optical reading device of claim 22, wherein the assembler rotates within the linear channel to differentially adjust the position of at least one of the two movable mirror clamps.

24. The optical reading device of claim 22, wherein the two supporting plates protrude from opposite sides of the housing.

25. A method for adjusting an optical reading device of a scanning apparatus, comprising:
securing a mirror having two ends to two mirror clamps, each mirror clamp engaging the mirror proximate one of the two ends, the mirror clamps each secured to one of two supporting plates protruding from opposite sides of a housing containing a light source, the mirror, a lens, and an image sensor, the mirror providing an optical path to the image sensor; and
differentially moving at least one of the two mirror clamps to rotate the mirror to correct the optical path.

26. The method of claim 25, wherein each of the two mirror clamps each having a gap and a tenon to accommodate the mirror and wherein securing the mirror to the two mirror clamps comprises positioning the mirror within the gap of each mirror clamp having the tenon thereof engaging the mirror.

27. The method of claim 25, wherein each of the two supporting plates further comprises a groove, and each of the two mirror clamps further comprises a linear block corresponding to the groove and wherein differentially moving at least one of the two mirror clamps to rotate the mirror to correct the optical path comprises sliding the linear block of at least one of the mirror clamps within one of the grooves.

28. The method of claim 25, wherein the bottom of each supporting plate further comprises a hole, and the bottom of each mirror clamp further comprises a channel corresponding to the hole and wherein differentially moving at least one of the two mirror clamps to rotate the mirror to correct the optical path comprises inserting an adjustment rod in the channel and rotating the adjustment rod.

29. The method of claim 25, further comprising differentially moving at least one of the two mirror clamps effective to compensate for a sloping of the mirror or of the image sensor.

* * * * *

UNITED STATES PATENT AND TRADEMARK OFFICE
CERTIFICATE OF CORRECTION

PATENT NO. : 7,556,196 B2  
APPLICATION NO. : 11/206873  
DATED : July 7, 2009  
INVENTOR(S) : Teng Kuang Lee It is certified that error appears in the above-identified patent and that said Letters Patent is hereby corrected as shown below:

Column 8
Line 19, change "each having" to --has--

Signed and Sealed this

Sixth Day of October, 2009

David J. Kappos
*Director of the United States Patent and Trademark Office*